(12) United States Patent
Yoshimoto et al.

(10) Patent No.: US 6,180,274 B1
(45) Date of Patent: Jan. 30, 2001

(54) CELL UNIT FOR FUEL CELLS

(75) Inventors: Yasunori Yoshimoto, Moriguchi; Takashi Yasuo, Hirakata; Yasuo Miyake, Neyagawa; Koji Nishio, Hirakata, all of (JP)

(73) Assignee: Sanyo Electric Co., Ltd., Moriguchi (JP)

( * ) Notice: Under 35 U.S.C. 154(b), the term of this patent shall be extended for 0 days.

(21) Appl. No.: 09/156,388

(22) Filed: Sep. 18, 1998

(30) Foreign Application Priority Data

Sep. 22, 1997 (JP) .................................................. 9-256370

(51) Int. Cl.[7] .................................................... H01M 2/00
(52) U.S. Cl. ................ 429/34; 429/30; 429/38; 429/39
(58) Field of Search ................... 429/34, 38, 39, 429/30

(56) References Cited

U.S. PATENT DOCUMENTS

| | | | |
|---|---|---|---|
| 4,988,583 | * | 1/1991 | Watkins et al. ......................... 429/30 |
| 5,176,966 | * | 1/1993 | Epp et al. ............................... 429/26 |
| 5,300,370 | * | 4/1994 | Washington et al. ................... 429/34 |
| 5,527,363 | * | 6/1996 | Wilkinson et al. ................... 29/623.1 |
| 5,912,088 | * | 6/1999 | Ernst ....................................... 429/35 |

* cited by examiner

*Primary Examiner*—Maria Nuzzolillo
*Assistant Examiner*—Raymond Alejandro
(74) *Attorney, Agent, or Firm*—Armstrong, Westerman, Hattori, McLeland & Naughton

(57) ABSTRACT

A cell unit for use in fuel cells of the type using an electrode portion having an anode formed of a plate or film on one surface of an electrolyte and a cathode formed of a plate or film on the other surface. An anode side plate of the invention has stepped portions to form recesses which accommodate the electrode and provide an anode side chamber facing the anode. A cathode side plate having a cathode side chamber facing the cathode is also accommodated in the recessed portions of the anode side plate. A fuel supply manifold and a fuel discharge manifold can extend through the stepped portions. Use of such cell units reduces the number of seal members required between fuel or oxidant manifolds when cell units are stacked to form a fuel cell stack. Such reduction in seal members simplifies fabrication of the units and renders the cell unit easier to maintain and repair.

16 Claims, 15 Drawing Sheets

CELL UNIT FOR FUEL CELLS

FIELD OF THE INVENTION

The present invention relates to the structure of cell units for use in fuel cells.

BACKGROUND OF THE INVENTION

As shown in FIG. 7, cell units for use in fuel cells generally comprise a cell 2 having an electrode portion 24 which is composed of an anode 21 formed on one surface of an electrolyte 20 in the form of a plate or film and a cathode 22 formed on the other surface of the electrolyte 20, an anode side plate 3 having an anode side chamber 30 facing the anode for passing hydrogen gas or like fuel therethrough, and a cathode side plate 4 having cathode side chambers 40 facing the cathode for passing air or like oxidant therethrough. A multiplicity of cell units 10 of the structure described are arranged in layers for use in the fuel cell.

The fuel cell has fuel manifolds for supplying the fuel from outside uniformly to the anode side chambers 30 of the respective anode side plates 3 and discharging the fuel flowing through the anode side chambers 30 to the outside. The fuel manifolds are formed inside the cell units 10, or alternatively externally of the cell units. Similarly, the fuel cell has oxidant manifolds for supplying the oxidant from outside uniformly to the cathode side chambers 40 of the respective cathode side plates 4 and discharging the oxidant flowing through the cathode side chambers 40 to the outside. The oxidant manifolds are formed inside the cell units 10, or alternatively externally of the cell units.

FIG. 7 shows fuel manifolds formed inside the cell unit 10. More specifically, FIG. 7 shows fuel supply manifolds 31, 90 extending through the anode side plate 3 and the cathode side plate 4, respectively, and communicating with the anode side chamber 30 of the anode side plate 3 for supplying the fuel to the anode side chamber 30, and fuel discharge manifolds 32, 91 extending through the anode side plate 3 and the cathode side plate 4, respectively, and communicating with the anode side chamber 30 of the anode side plate 3 for discharging the fuel passing through the anode side chamber 30.

As shown in FIG. 7, a seal member 5 for preventing the fuel from leaking is disposed between the anode side plate 3 and the cathode side plate 4.

Provision of seal members requires many steps of work for forming seal grooves and installing the seal members and is therefore costly, so that it is desired to minimize the number of locations where the seal member needs to be provided.

To diminish the number of seal members 5 to be installed for the fuel manifolds, the anode side plate 3 of one cell unit 10 and the cathode side plate 4 of another cell unit 10 adjacent thereto are integrally made into a bipolar plate 8 as shown in FIG. 8. Since this structure requires no seal member 5 between the anode side plate 3 and the cathode side plate 4 of the adjacent cell units 10, the number of seal members 5 needed for the fuel manifolds can be reduced.

However, in fabricating a fuel cell with use of bipolar plates 8, it is necessary to arrange cells 2 and bipolar plates 8 alternately in layers. At this time, the cell 2 adheres to the bipolar plate 8 adjacent thereto. Accordingly, when there arises a need to replace the cell 2, the cell 2 must be peeled off the bipolar plate 8 and is therefore difficult to repair or maintain. Moreover, the cell substituted for the removed cell is likely to alter the performance depending on the state of the cell as attached to the bipolar plate 8, failing to assure the fuel cell of stabilized performance in its entirety.

SUMMARY OF THE INVENTION

An object of the present invention is to provide a cell unit for use in fuel cells which is reduced in the number of seal members required for fuel manifolds or oxidant manifolds to simplify the fabrication process of the unit and to render the cell unit easy to maintain or repair.

To fulfill the above object, the present invention provides a cell unit for use in fuel cells which comprises an anode side plate having a pair of first and second stepped portions approximately parallel to each other and projecting from one surface of a generally rectangular base plate, the stepped portions and the base plate surface defining a recessed portion, the base plate surface of the recessed portion being recessed to provide an anode side chamber; a cell including an electrode portion having an anode formed on one surface of an electrolyte in the form of a plate or film and a cathode formed on the other surface of the electrolyte, the cell being accommodated in the recessed portion of the anode side plate with the anode facing the anode side chamber of the anode side plate; and a cathode side plate having a cathode side chamber formed in one surface of a generally rectangular base plate, the cathode side plate being accommodated in the recessed portion of the anode side plate with the cathode side chamber facing the cathode of the cell. The stepped portions of the anode side plate have respective top faces substantially flush with the other surface of the cathode side plate, with the cell and the cathode side plate accommodated in the recessed portion of the anode side plate.

Alternatively, the anode side plate can be formed with a stepped portion on one surface of its base plate along the entire outer periphery thereof.

A fuel supply manifold for passing a fuel therethrough and a fuel discharge manifold for passing therethrough the fuel to be discharged can be made to extend through the respective stepped portions and the base plate, with the supply manifold held in communication with the anode side chamber and with the anode side chamber held in communication with the discharge manifold by respective internal manifolds.

A stepped portion or stepped portions can be formed on the cathode side plate instead of the stepped portion or portions formed on the anode side plate.

A bipolar plate is usable in the cell unit of the invention for use in fuel cells, the bipolar plate comprising a generally rectangular base plate and being provided with a stepped portion on each of opposite surfaces of the base plate to form an anode side chamber in one of the surfaces and a cathode side chamber in the other surface.

The cell unit of the present invention can be smaller in the number of seal members required than in conventional cell units since the seal members conventionally used between the anode side plate and the cathode side plate can be dispensed with.

With the cell unit of the invention, the cell is sandwiched between the anode side plate and the cathode side plate, so that the components of fuel cells can be fabricated in the form of cell units. The fuel cell can therefore be checked for performance or maintained from unit to unit.

Since the fuel cell is fabricated by arranging a plurality of cell units of the invention into an assembly of layers, a malfunctioning cell unit, if found, can be removed singly after use for replacement. This results in facilitated repair or maintenance, assuring the fuel cell of more stabilized performance.

When comprising the bipolar plate of the invention, the cell unit also has these advantages.

DETAILED DESCRIPTION OF THE INVENTION

Figure 1:
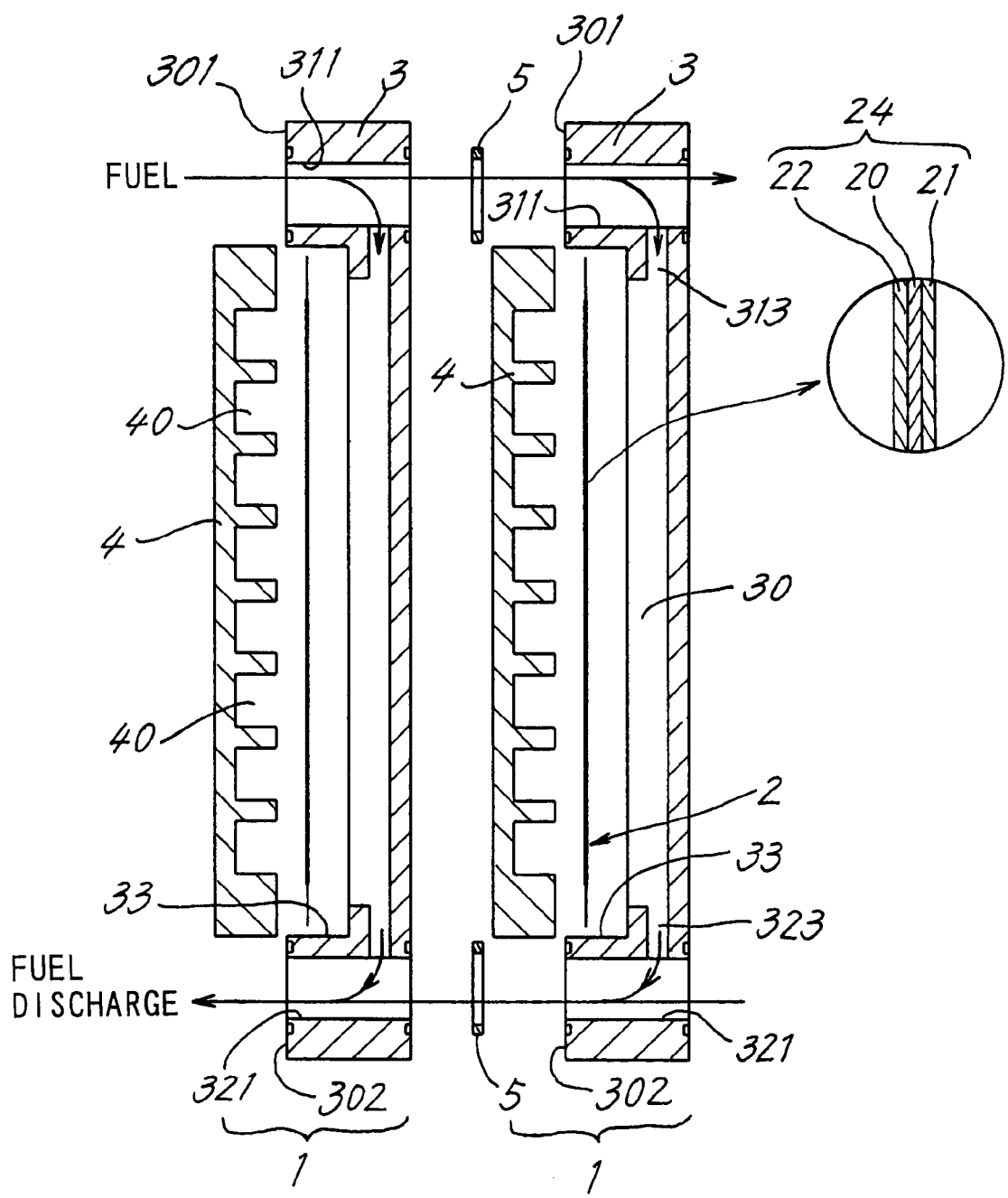
FIG. 1 is an exploded sectional view showing an embodiment of cell unit of the invention for use in common fuel cells.

The present invention will be described below in detail with reference to the embodiments shown in the drawings.

FIG. 1 is an exploded sectional view of cell units 1 for use in common fuel cells.

The cell unit 1 for use in fuel cells comprises a cell 2 including an electrode portion 24 which has an anode 21 formed on one surface of an electrolyte 20 in the form of a plate or film and a cathode 22 formed on the other surface of the electrolyte 20, an anode side plate 3 disposed on the anode (21) side of the cell 2, and a cathode side plate 4 disposed on the cathode (22) side of the cell 2.

The anode side plate 3 has an anode side chamber 30 for passing hydrogen gas or like fuel therethrough. The cathode side plate 4 has cathode side chambers 40 for passing air or like oxidant therethrough. A multiplicity of such cell units 1 are arranged in layers for use in the fuel cell.

The fuel cell has fuel manifolds through which the fuel fed from outside is uniformly supplied to the anode side chambers 30 of the anode side plate 3 and discharged to the outside after passing through the chambers 30. The fuel manifolds are formed inside the cell unit, or alternatively externally of the cell unit.

Similarly, the fuel cell has oxidant manifolds for uniformly supplying the oxidant from outside to the cathode side chambers 40 of the cathode side plates 4 and discharging the oxidant passing through the chambers 40 to the outside. The oxidant manifolds are formed inside the cell unit, or alternatively externally of the cell unit.

With the cell unit 1 shown in FIG. 1, fuel manifolds are formed inside the cell unit 1. The anode side plate 1 is formed in its upper end with a fuel supply manifold 311 for passing therethrough the fuel supplied from outside and in its lower end with a fuel discharge manifold 321 for passing therethrough the fuel to be discharged from the anode side plate 3.

The anode side plate 3 comprises a generally rectangular base plate and has a pair of first and second stepped portions 301, 302 approximately parallel to each other and projecting from one surface of the base plate at respective opposite edge portions thereof. The stepped portions 301, 302 and the base plate surface define a recessed portion 33. The base plate surface of the recessed portion 33 is recessed to provide the anode side chamber 30. The anode side plate 3 has a fuel supply passageway 313 formed between the fuel supply manifold 311 and the anode side chamber 30, and a fuel discharge passageway 323 between the anode side chamber 30 and the fuel discharge manifold 321. The supply manifold 311, chamber 30 and discharge manifold 321 communicate with one another through these passageways.

The cell unit 1 is completed by placing the cell 2 into the recessed portion 33 with the anode 21 exposed to the anode side chamber 30 and subsequently placing the cathode side plate 4 into the recessed portion 33 with the cathode 22 of the cell 2 exposed to the cathode side chambers 40. In this state, the top faces of the stepped portions 301, 302 of the anode side plate 3 become substantially flush with the surface of the cathode side plate 4 opposite to their chambers 40.

Cell units 1 are arranged into an assembly of cell layers to provide a fuel cell, with seal members 5, 5 disposed respectively between the fuel supply manifolds 311, 311 of each pair of adjacent cell units 1, 1 and between the fuel discharge manifolds 321, 321 thereof.

Figure 2:
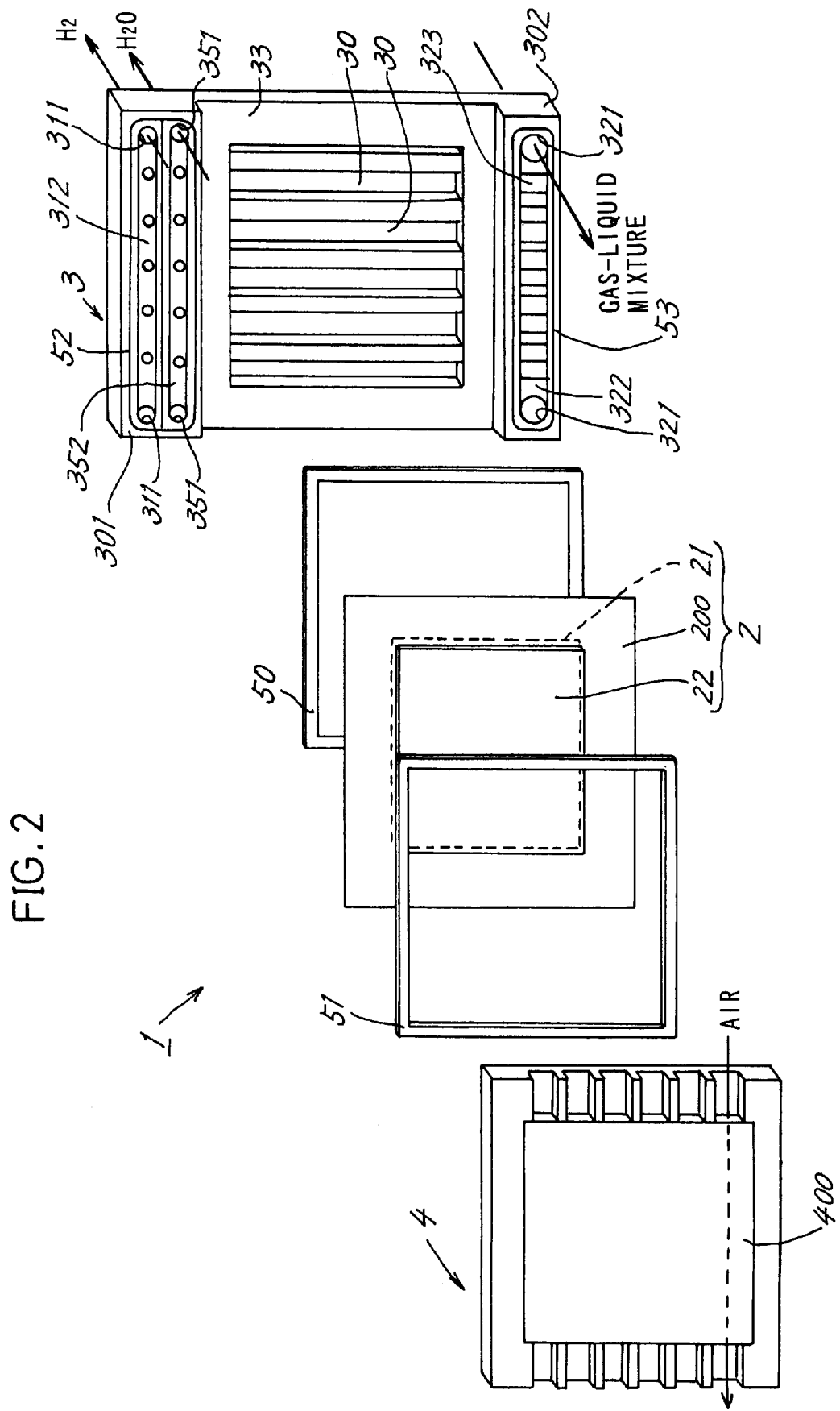
FIG. 2 is an exploded perspective view showing an embodiment of cell unit of the invention for use in solid polymer electrolyte fuel cells.
Figure 3:
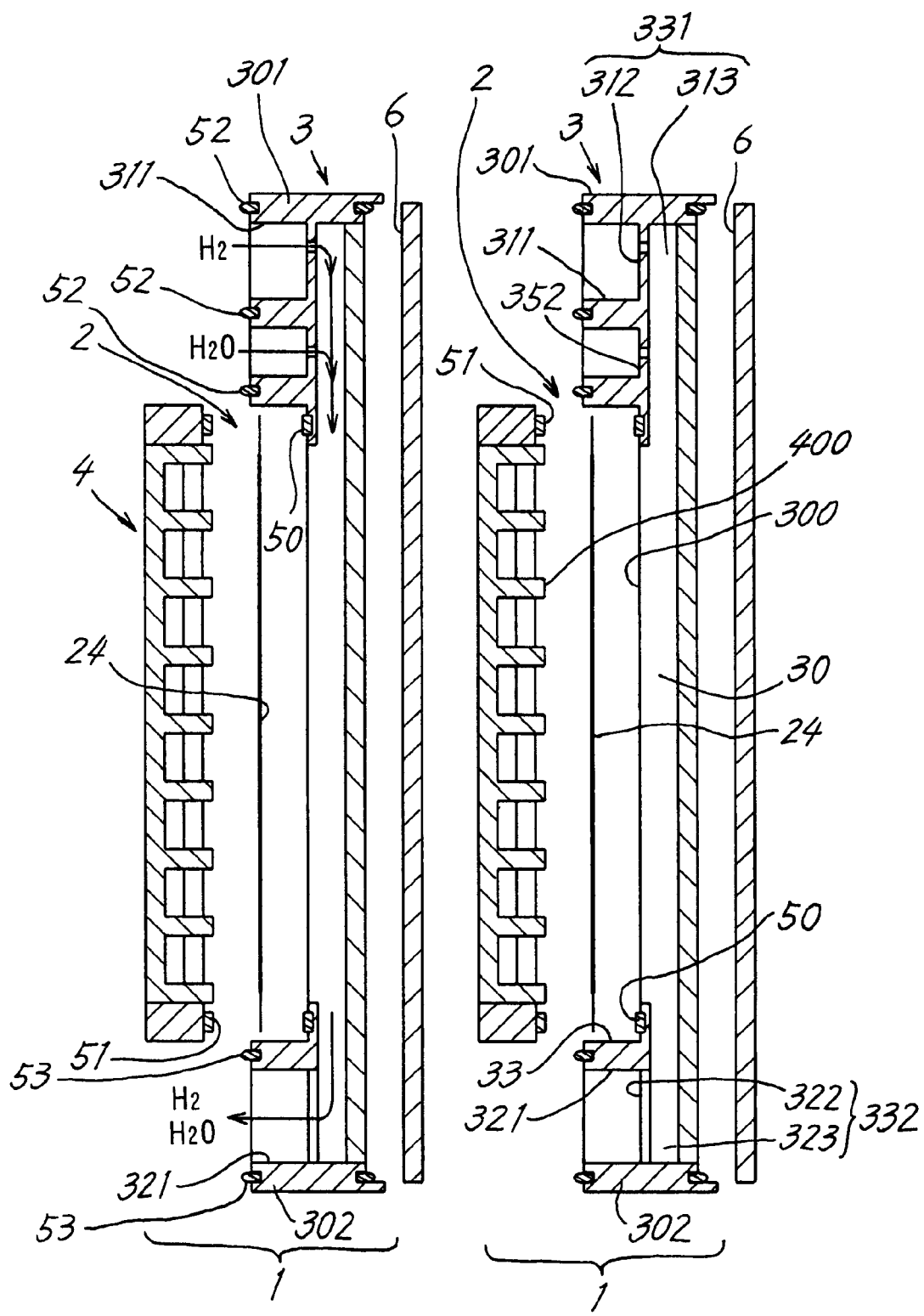
FIG. 3 is an exploded sectional view showing the embodiment of cell unit of the invention for use in solid polymer electrolyte fuel cells.

FIGS. 2 and 3 show cell units 1 for use in solid polymer electrolyte fuel cells.

The cell unit 1 includes an anode side plate 3 which, as in FIG. 1, comprises a generally rectangular base plate and has a pair of first and second stepped portions 301, 302 approximately parallel to each other and projecting from one surface of the base plate at respective opposite edge portions thereof. The stepped portions 301, 302 and the base plate surface define a recessed portion 33. A plurality of ridges are formed in the base plate surface of the recessed portion 33 to provide anode side chambers 30 for passing the fuel therethrough. Fuel supply manifolds 311, 311 for passing therethrough the fuel (i.e., hydrogen gas) supplied from outside extend through the first stepped portion 301 and the base plate. Fuel discharge manifolds 321, 321 for passing therethrough the hydrogen gas to be discharged from the plate 3 extend through the second stepped portion 302 and the base plate.

With solid polymer electrolyte fuel cells, it is necessary to hold a solid polymer electrolyte film 200 wet. Accordingly, the anode side plate 3 has water supply manifolds 351, 351 adjacent to the fuel supply manifolds 311, 311 and extending through the first stepped portion 301 and the base plate for passing therethrough the water supplied from outside.

The hydrogen gas and water to be supplied are mixed together in fuel supply passageways 313, and the mixture is passed through the anode side chambers 30 and then discharged. Accordingly, the gas-liquid mixture to be discharged from the anode side plate 3 is passed through the fuel discharge manifolds 321, 321.

Figure 9:
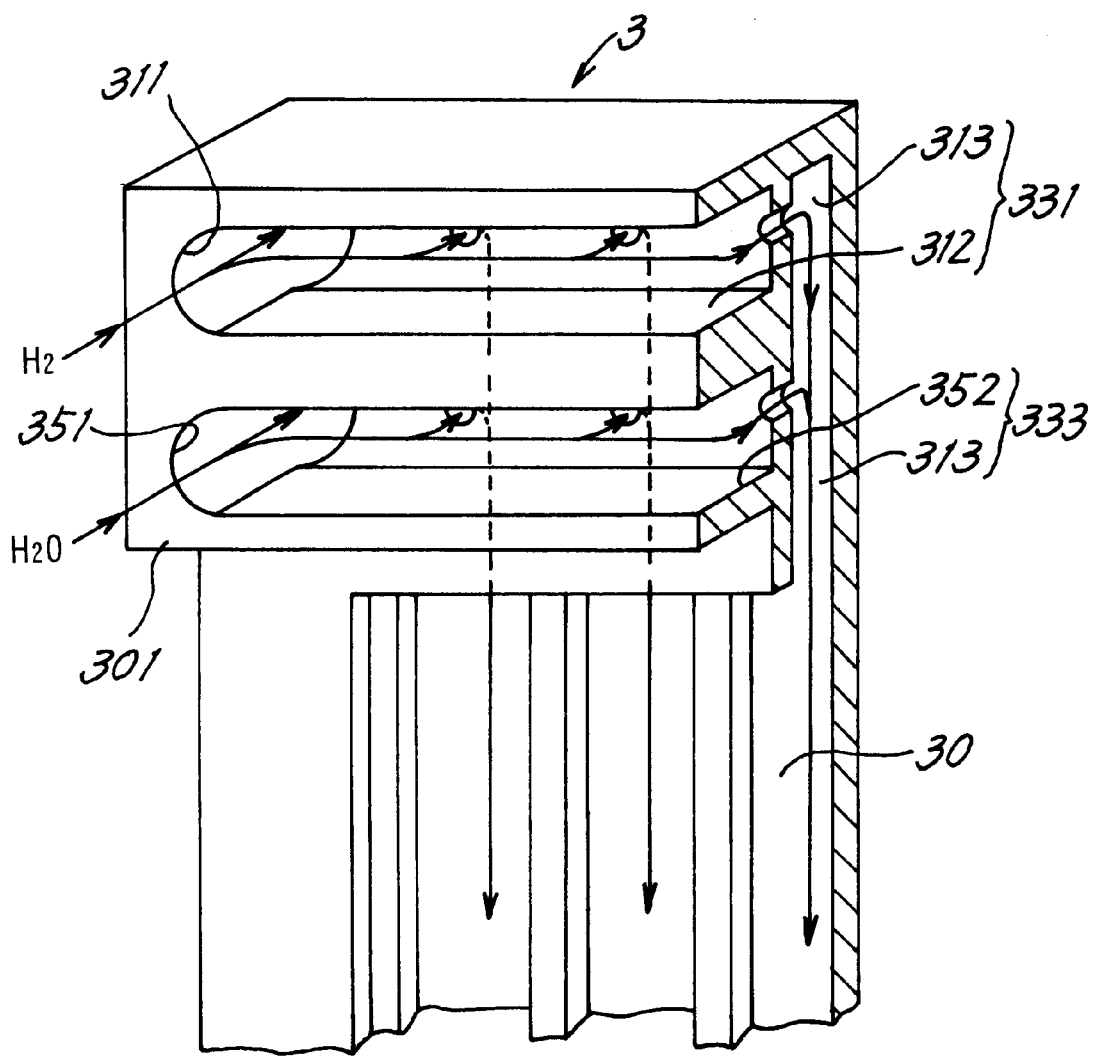
FIG. 9 is a perspective view partly broken away and showing a manifold for dividedly supply a fuel to anode side chambers.

It is desired that a manifold 331 be provided between the fuel supply manifolds 311 and the anode side chambers 30 for supplying the fuel uniformly. The manifold is shown in FIG. 9 in detail. The manifold 331 comprises a fuel supply groove 312 formed in communication with the fuel supply manifolds 311, 311, and a plurality of fuel supply passageways 313 communicating with the supply groove 312 and the anode side chambers 30. The fuel supply passageways 313 include a plurality of small ports as illustrated, and the supply of hydrogen gas from the supply manifolds 311 to the anode side chambers 30 is restricted by the small ports to ensure equivalent supply of hydrogen gas to the anode side chambers 30.

Figure 10:
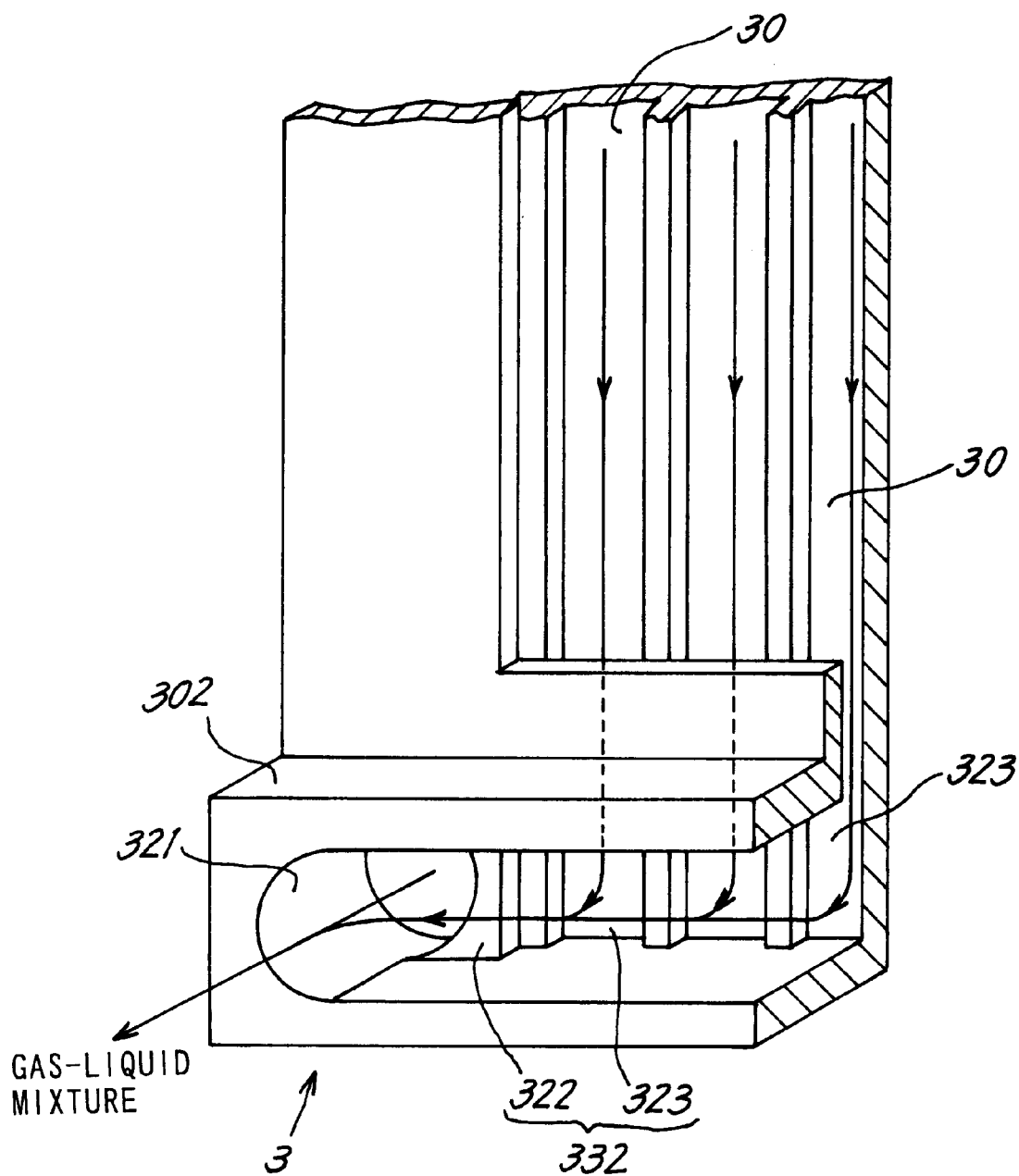
FIG. 10 is a perspective view partly broken away and showing a manifold for discharging the fuel as collected from the anode side chambers.

Preferably, a manifold 332 for collectively discharging the fuel from the anode side chambers is provided between the anode side chambers 30 and the fuel discharge manifolds 321. The manifold 332, which is shown in detail in FIG. 10, comprises a fuel discharge groove 322 formed in communication with the fuel discharge manifolds 321, and a plurality of fuel discharge passageways 323 communicating with the groove 322 and the anode side chambers 30.

The water supply manifolds 351 can be provided with a similar manifold 333, which comprises a water supply groove 352 communicating with the water supply manifolds 351, and the fuel supply passageways 313. Accordingly, the hydrogen gas flowing into the fuel supply groove 312 from the fuel supply manifolds 311, 311 is admitted to the fuel supply passageways 313, in which the gas is mixed with the water flowing into the water supply groove 352 from the water supply manifolds 351, 351 to make a gas-liquid mixture. The mixture is sent into the anode side chambers 30. The mixture passing through the anode side chambers 30 flows through the fuel discharge passageways 323 and the fuel discharge groove 322 and is sent into the fuel discharge manifolds 321, 321.

A platelike gasket 50 serving as a seal member 5 is provided along the periphery of the recessed portion 33 of the anode side plate 3. Similarly, a platelike gasket 51 serving as a seal member 5 is provided for a cathode side plate 4 along the periphery of the surface thereof to be opposed to a cell 2.

The cell 2 is placed into the recessed portion 33 of the anode side plate 3, with the anode 21 thereof in contact with the base plate surface 300 of recessed portion 33 of the anode side plate 3 and with the peripheral edge of the cell in contact with the gasket 50.

Next, the cathode side plate 4 is placed into the recessed portion 33, with a base plate surface 400 in contact with the cathode 22 of the cell 2 and with the gasket 51 in contact with the peripheral edge of the cell 2, whereby a cell unit 1 is completed. In this state, the top faces of the stepped portions 301, 302 of the anode side plate 3 are approximately flush with the surface of the cathode side plate 4 opposite to the cathode side chambers 40 thereof.

The cell unit 1 thus constructed has an O-ring 52 serving as a seal member 5 and provided around the fuel supply manifolds 311, 311 and the fuel supply groove 312 and around the water supply manifolds 351, 351 and the water supply groove 352, and an O-ring 53 serving as a seal member 5 and provided around the fuel discharge manifolds 321, 321 and the fuel discharge groove 322. A partition plate 6 is placed over the cell unit 1 for preventing mixing of hydrogen gas and water, another cell unit 1 is placed over the cell unit 1, and this procedure is repeated to form an assembly of cell layers for a fuel cell. In the case where the base plates are made of a gas impermeable material, such partition plates 6 can be dispensed with.

The recessed portion 33 of the anode side plate 3 of the present embodiment is left free at its lateral opposite sides, so that there is the likelihood of the cell 2 and the cathode side plate 4 becoming displaced laterally relative to the anode side plate 3.

Figure 4:
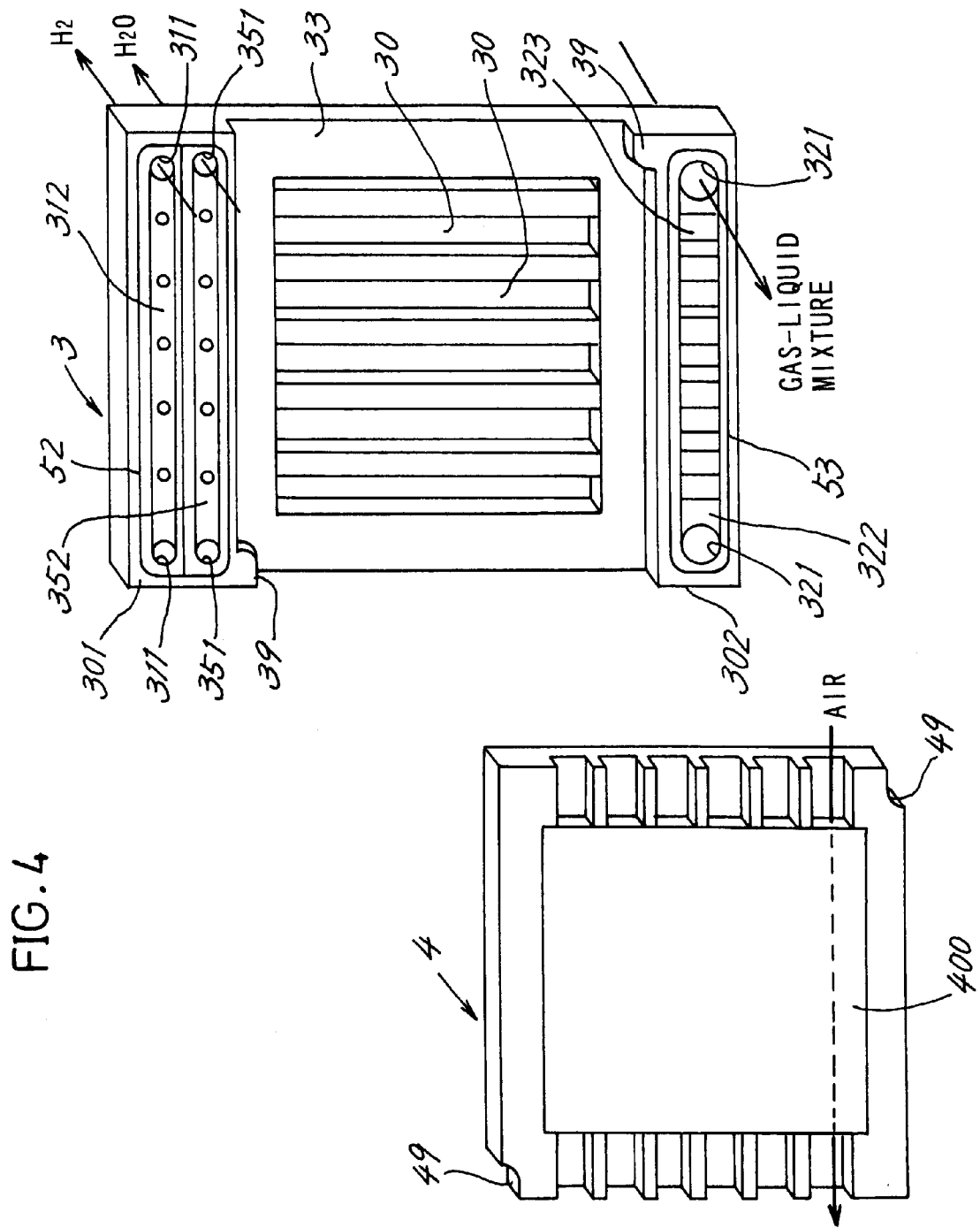
FIG. 4 is an exploded perspective view of the embodiment of FIG. 2 to show movement restraining means formed therein.

As shown in FIG. 4, therefore, it is desirable to provide lateral movement restraining means, i.e., projections 39, 39 at corners of the recessed portion 33 of the anode side plate 3, and cutouts 49, 49 in the cathode side plate 4 at locations to be opposed to the respective projections 39, 39. The projections 39, 39 and the cutouts 49, 49 formed make it possible to accommodate the cathode side plate 4 in the recessed portion 33 of the anode side plate 3 with accuracy and ease.

Figure 11:
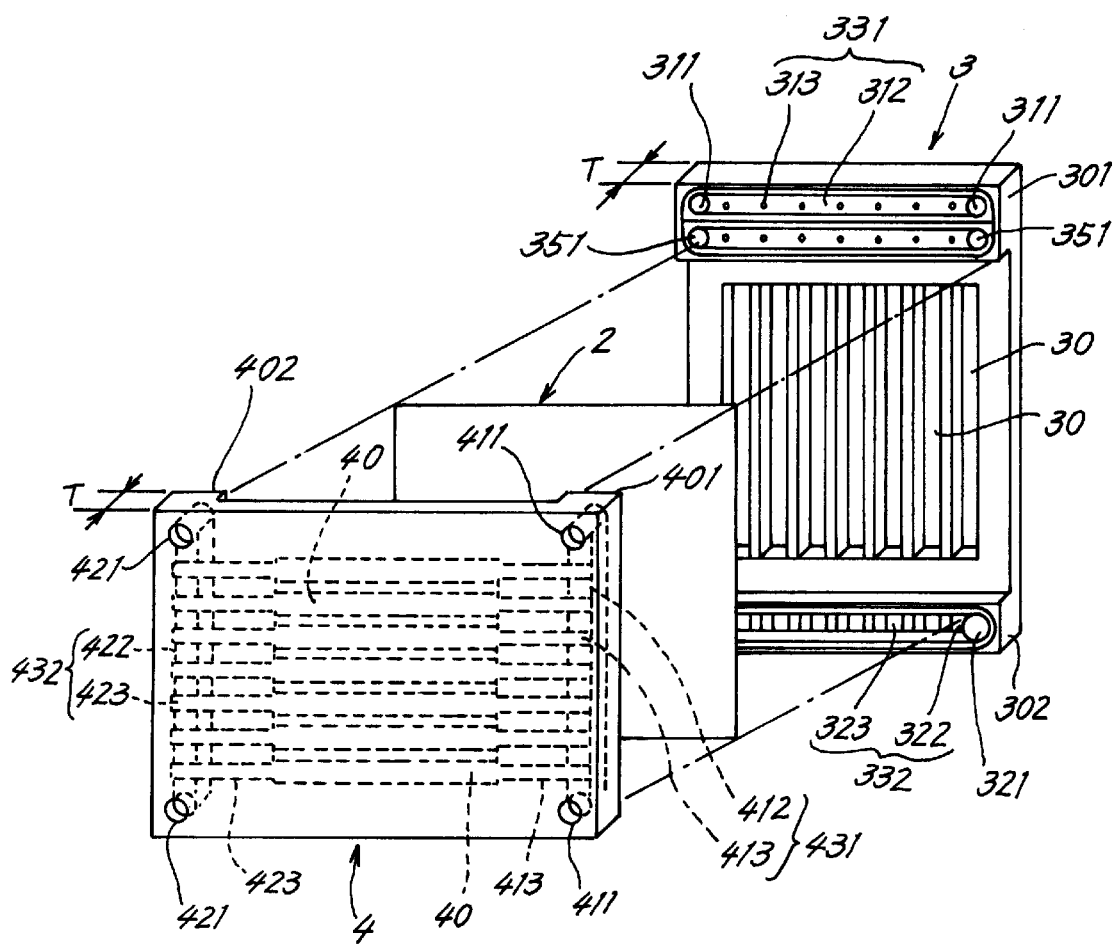
FIG. 11 is an exploded perspective view showing an embodiment wherein stepped portions are formed on both an anode side plate and a cathode side plate.

FIG. 11 shows an embodiment comprising a cathode side plate 4 which is also formed with first and second stepped portions 401, 402. The thickness T including the stepped portion and base plate of the cathode side plate 4 is approximately equal to the thickness T including the stepped portion and base plate of the anode side plate.

As is the case with the anode side plate 3, it is desired that the cathode side plate 4 have a first manifold 431 for holding oxidant supply manifolds 411 for passing an oxidant therethrough in communication with cathode side chambers 40, and a second manifold 432 for holding oxidant discharge manifolds 421 for passing therethrough the oxidant to be discharged in communication with the cathode side chambers 40.

The first manifold 431 comprises an oxidant supply groove 412 communicating with the oxidant supply manifolds 411, and a plurality of oxidant supply passageways 413 communicating with the oxidant supply groove 412 and the cathode side chambers 40. The second manifold 432 comprises an oxidant discharge groove 422 communicating with the oxidant discharge manifolds 421, and a plurality of oxidant discharge passageways 423 communicating with the oxidant discharge groove 422 and the cathode side chambers 40.

The embodiment of FIG. 11 is free of the likelihood that the cell 2 and the cathode side plate 4 will be displaced laterally relative to the anode side plate 3.

With the foregoing embodiment for use in solid polymer electrolyte fuel cells, usable as materials for the components of the cell 2 are perfluorocarbonsulfonic acid (e.g., brand name "Nafion," product of Du Pont) for the solid polymer electrolyte film, and platinum-supported carbon (the carbon is, for example, carbon black with the brand name "Vulcan XC-72R," product of CABOT) for the anode 21 and cathode 22.

Usable as component materials for the anode side plate 3 are a carbon material or porous carbon material for the base plate, and a high-molecular-weight material (such as phenol, epoxy, Teflon or polyphenylene sulfide) for the stepped portions. The portion of the base plate for forming the anode side chambers 30 can be prepared from the carbon material or porous carbon material, and the other portion thereof from the high-molecular-weight material.

Usable as component materials for the cathode side plate 4 are a carbon material or porous carbon material for the base plate, and a high-molecular-weight material (such as phenol, epoxy, Teflon or polyphenylene sulfide) for the stepped portions. The portion of the base plate for forming the cathode side chambers 40 can be prepared from the carbon material or porous carbon material, and the other portion thereof from the high-molecular-weight material.

Fluororubber (e.g., brand name "Viton," product of Du Pont) is usable for the seal materials 5.

A carbon material is usable for the partition plates 6.

Figure 5:
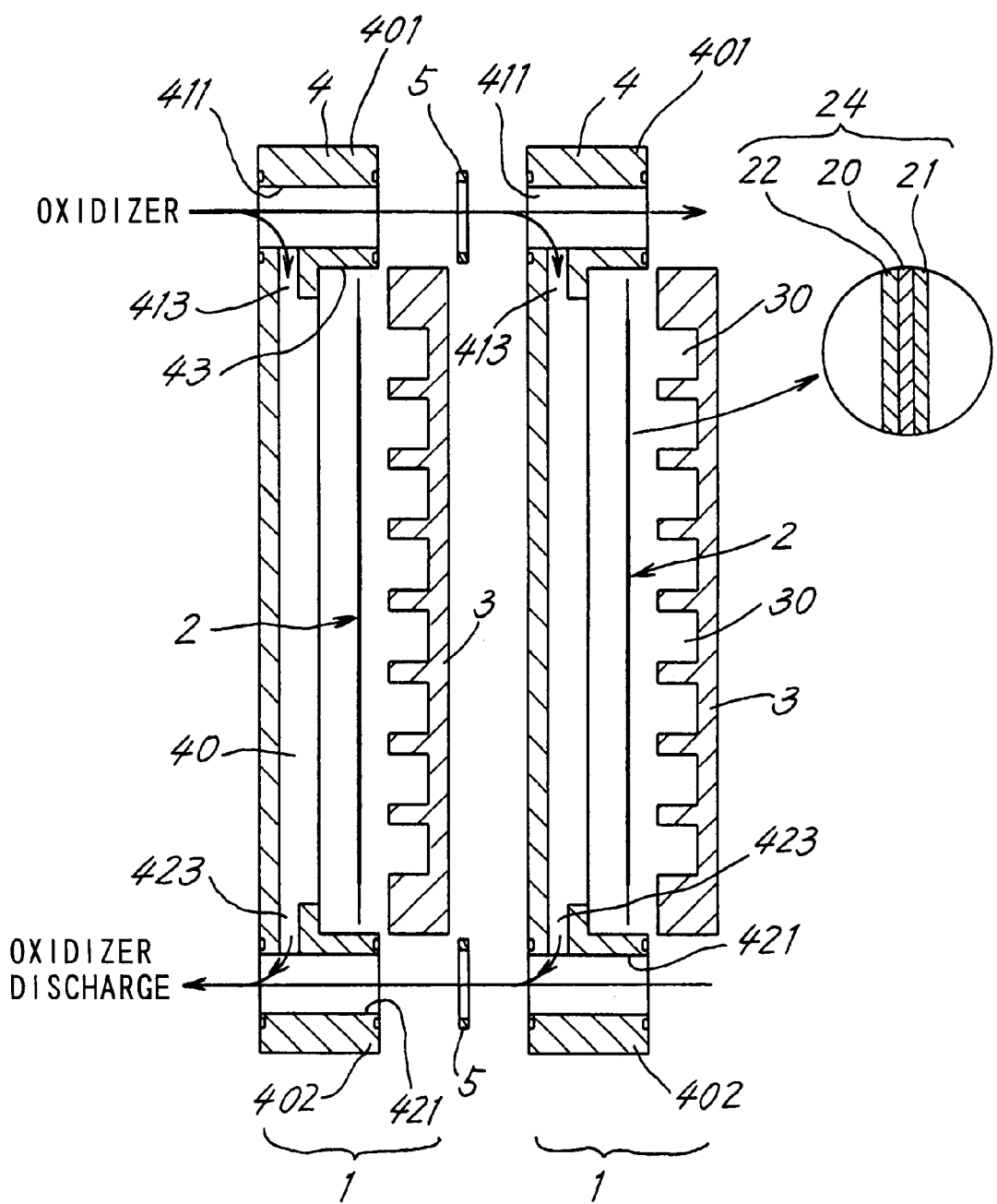
FIG. 5 is an exploded sectional view showing an embodiment wherein stepped portions are formed on a cathode side plate.

FIG. 5 shows an embodiment wherein stepped portions are formed on a cathode side plate 4 instead of forming the stepped portions on an anode side plate 3. With this embodiment, the cathode side plate 4 comprises a base plate and has a pair of first and second stepped portions 401, 402 approximately parallel to each other and projecting from one surface of the base plate at respective opposite edge portions thereof. The stepped portions 401, 402 and the base plate surface define a recessed portion 43. The base plate surface of the recessed portion 43 is recessed to provide a cathode side chamber 40. The same cell 2 as already described and the anode side plate 3 which has anode side chambers 30 formed in one surface of a base plate are placed into the recessed portion 43 to assemble a cell unit.

It is desired that the embodiment shown in FIG. 5, like the preceding embodiment, have a manifold formed between the cathode side chamber 40 and oxidant supply manifolds 411 for uniformly supplying the oxidant to the chamber 40. This manifold is nearly the same as the manifold 431 of the cathode side plate of FIG. 11, and comprises an oxidant supply groove 412 communicating with the oxidant supply manifolds 411, and a plurality of oxidant supply passageways 413 communicating with the oxidant supply groove 412 and the cathode side chamber 40. Similarly, it is desired to provide a manifold between the cathode side chamber 40 and oxidant discharge manifolds 421 for collectively discharging therethrough the oxidant to be discharged from the cathode side chamber. This manifold is also nearly the same as the manifold 432 of the cathode side plate of FIG. 11, and comprises an oxidant discharge groove 422 communicating with the oxidant discharge manifolds 421, and a plurality of oxidant discharge passageways 423 communicating with the oxidant discharge groove 422 and the cathode side chamber 40.

Figure 12:
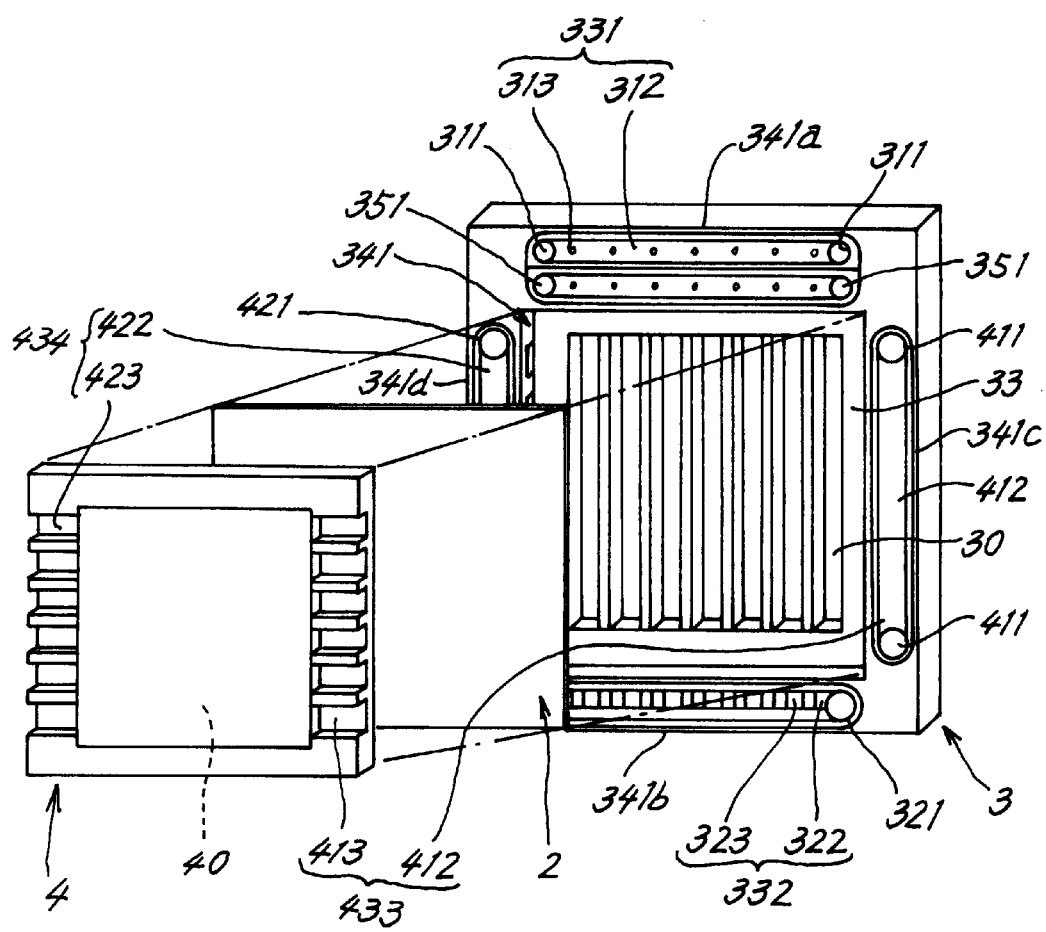
FIG. 12 is an exploded perspective view showing an embodiment wherein a stepped portion is formed on the base plate of an anode side plate along the entire outer periphery thereof.

FIG. 12 shows an embodiment wherein an anode side plate 3 has a stepped portion 341 extending along the entire outer periphery of the base plate thereof.

It is desired that this embodiment also have manifolds in its interior. Stated more specifically, the stepped portion 341 includes a first part 341a formed with a first manifold 331 for holding fuel supply manifolds 311 for passing the fuel therethrough in communication with anode side chambers 30, a second part 341b formed with a second manifold 332 for holding fuel discharge manifolds 321 for passing therethrough the fuel to be discharged in communication with the anode side chambers 30, a third part 341c formed with a third manifold 433 for holding oxidant supply manifolds 411 for passing the oxidant therethrough in communication with a cathode side chamber 40 in a cathode side plate 4, and a fourth part 341d formed with a fourth manifold 434 for holding oxidant discharge manifolds 421 for passing therethrough the oxidant to be discharged in communication with the cathode side chamber 40 of the cathode side plate 4.

This embodiment is also free of the likelihood that the cell 2 and the cathode side plate 4 will be displaced laterally relative to the anode side plate 3.

Like the preceding embodiment, the embodiment of FIG. 12 can be provided with a stepped portion formed on the cathode side plate 4 in place of the stepped portion on the anode side plate 3.

Figure 13:
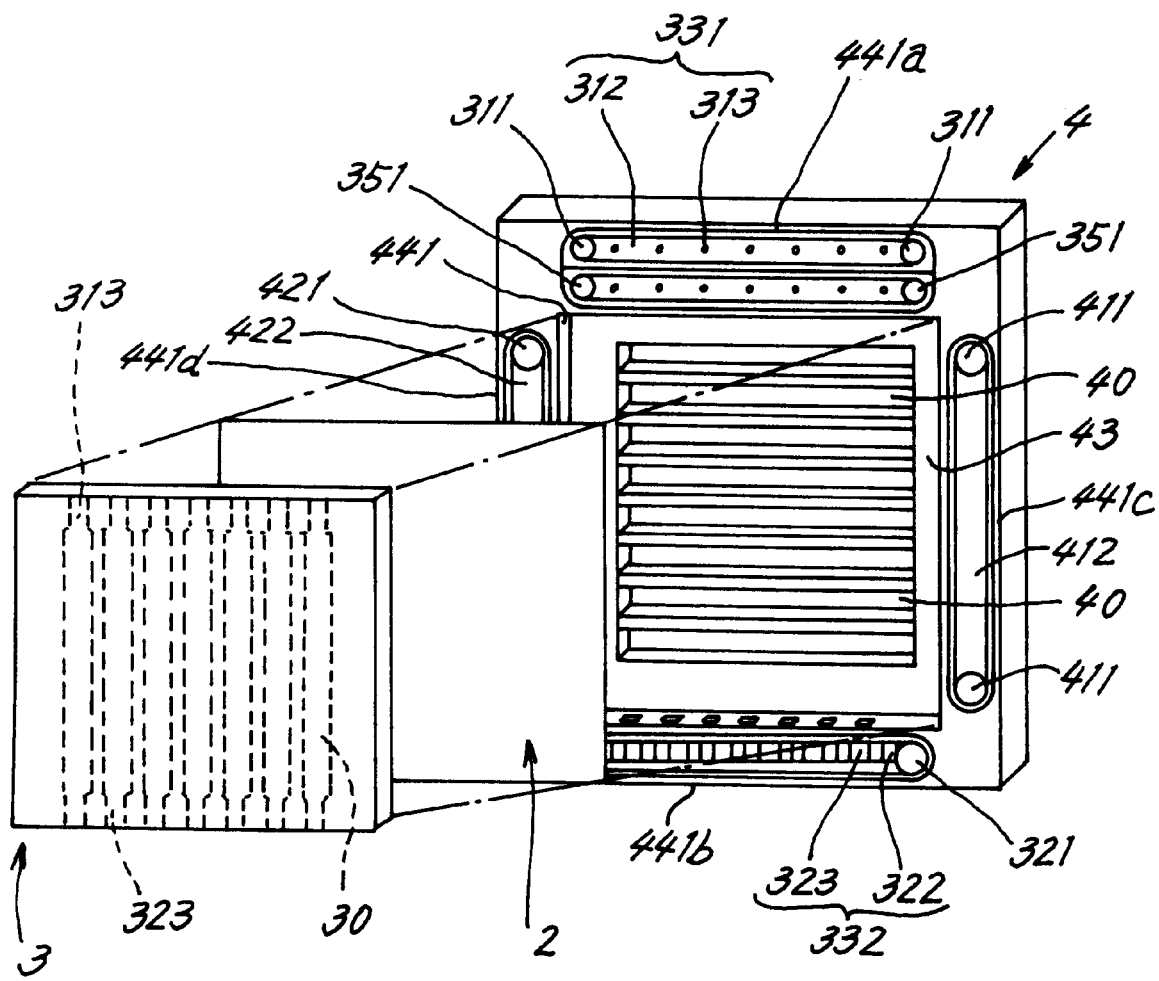
FIG. 13 is an exploded perspective view showing an embodiment wherein a stepped portion is formed on the base plate of a cathode side plate along the entire outer periphery thereof.

FIG. 13 is a embodiment wherein a cathode side plate 4 has a stepped portion 441 extending along the entire outer periphery of the base plate thereof.

It is desired that this embodiment also have manifolds In its interior. Stated more specifically, the stepped portion 441 includes a first part 441a formed with a first manif old 331 for holding fuel supply manifolds 311 for passing the fuel therethrough in communication with anode side chambers 30 in an anode side plate 3, a second part 441b formed with a second manifold 332 for holding fuel discharge manifolds 321 for passing therethrough the fuel to be discharged in communication with the anode side chambers 30 of the anode side plate 3, a third part 441c formed with a third manifold for holding oxidant supply manifolds 411 for passing the oxidant therethrough in communication with cathode side chambers 40, and a fourth part 441d formed with a fourth manifold for holding oxidant discharge manifolds 421 for passing therethrough the oxidant to be discharged in communication with the cathode side chambers 40. Although not shown in FIG. 13, the third manifold comprises an oxidant supply groove 412, and oxidant supply passageways (not shown) communicating with the cathode side chambers 40, and the fourth manifold comprises an oxidant discharge groove 422, and oxidant discharge passageways (not shown) communicating with the cathode side chambers 40.

Figure 6:
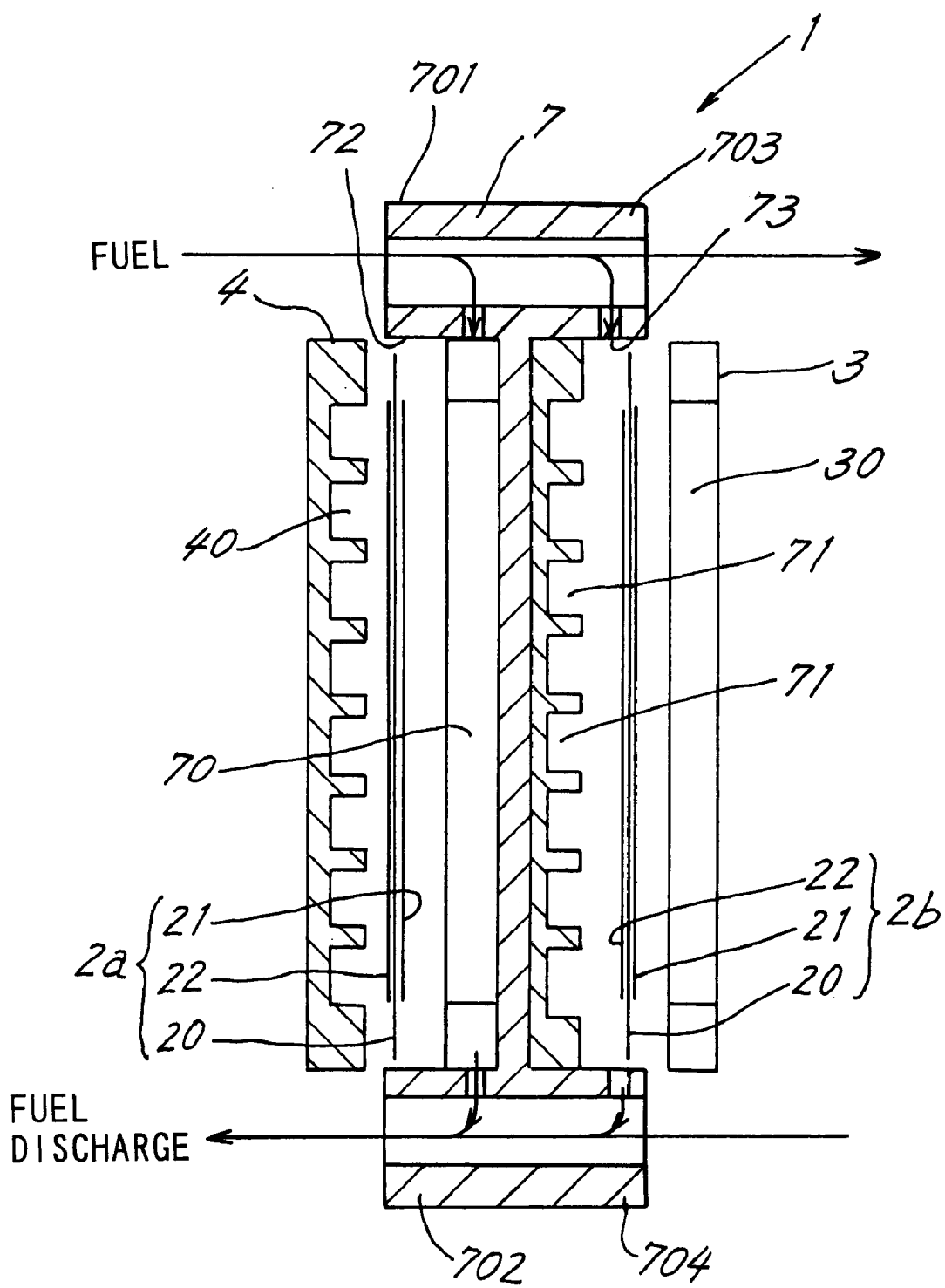
FIG. 6 is an exploded sectional view showing an embodiment wherein stepped portions are formed on a bipolar plate.
Figure 7:
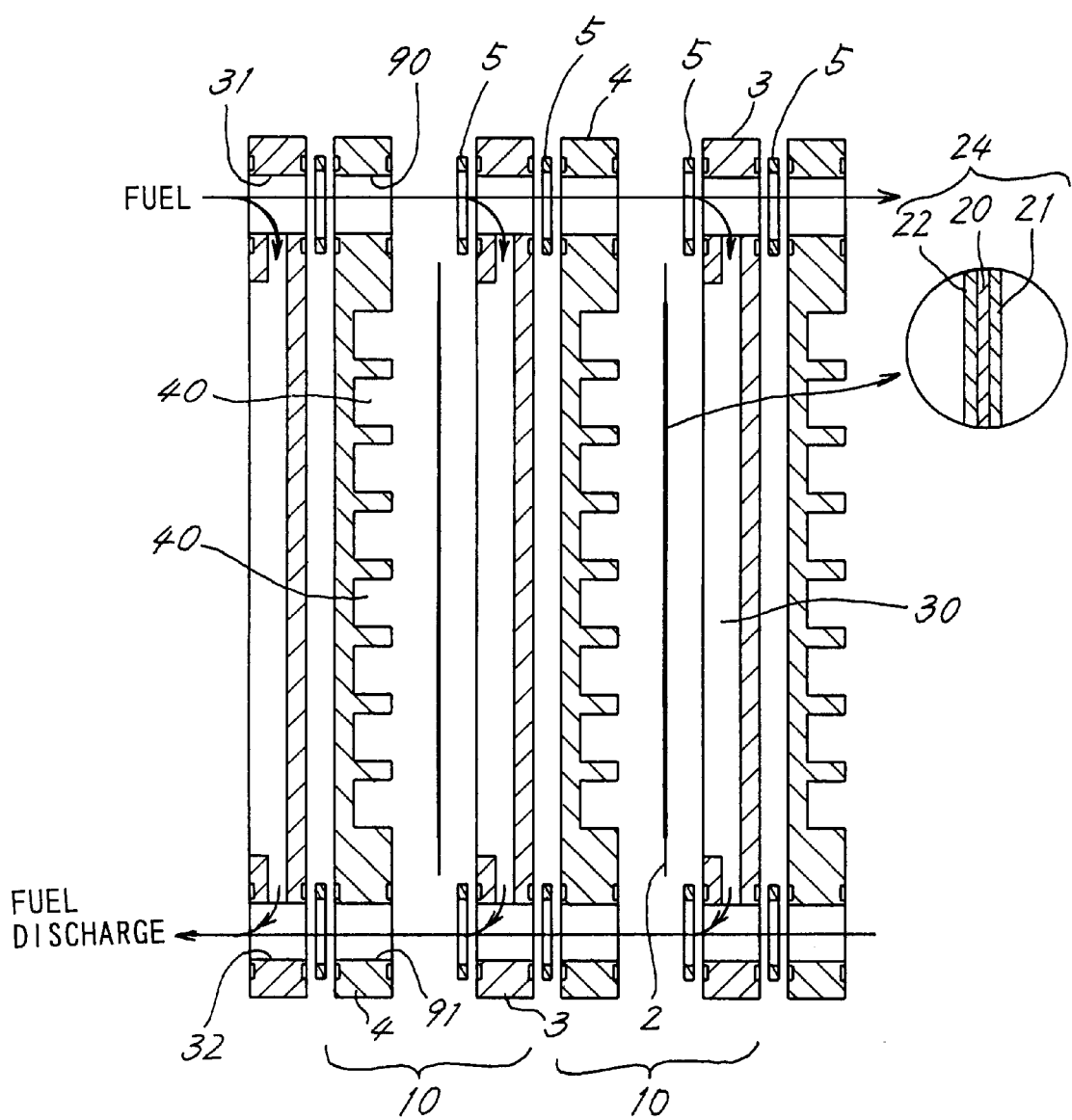
FIG. 7 is an exploded sectional view showing a conventional cell unit.
Figure 8:
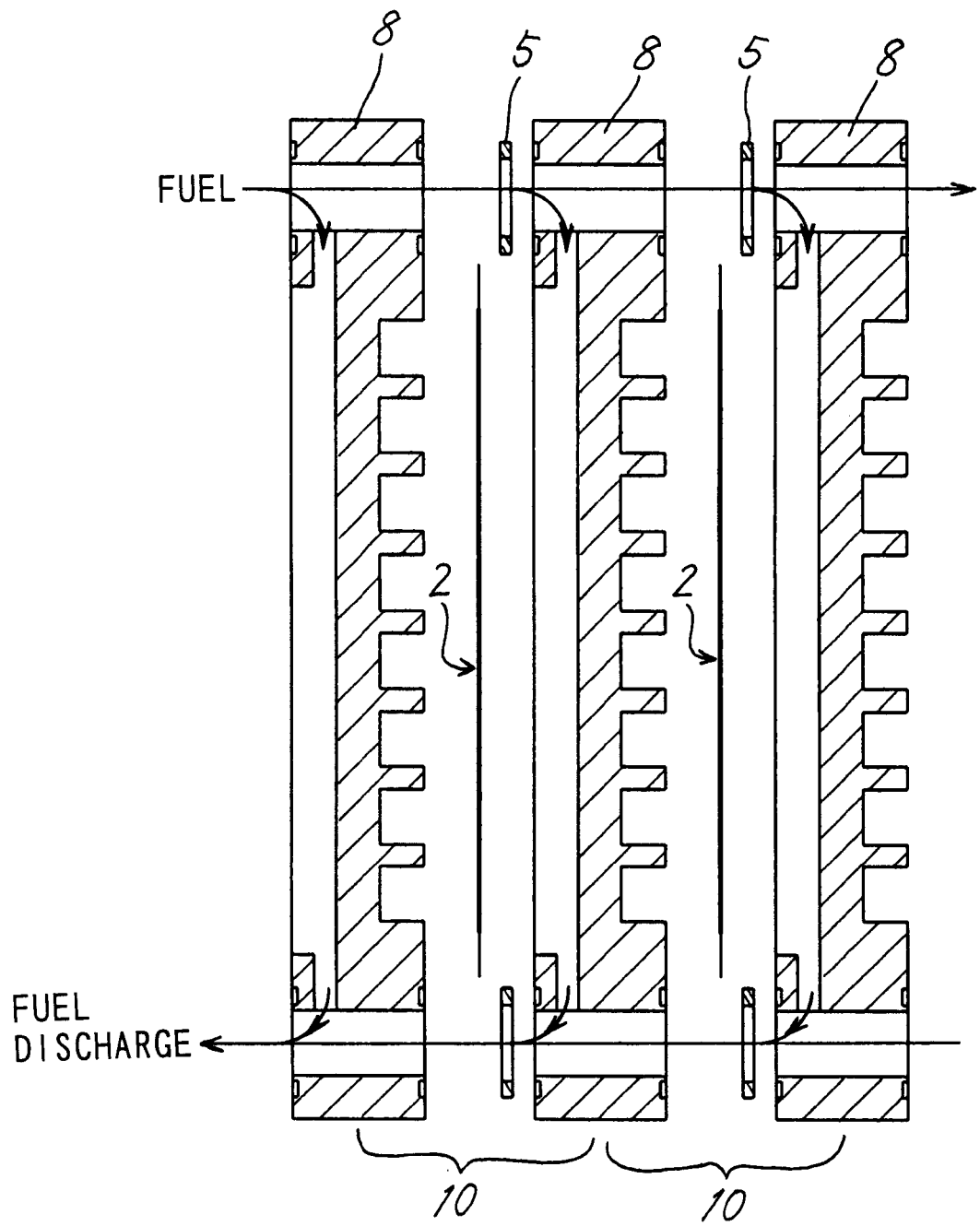
FIG. 8 is an exploded sectional view showing a conventional cell unit comprising bipolar plates.
Figure 14:
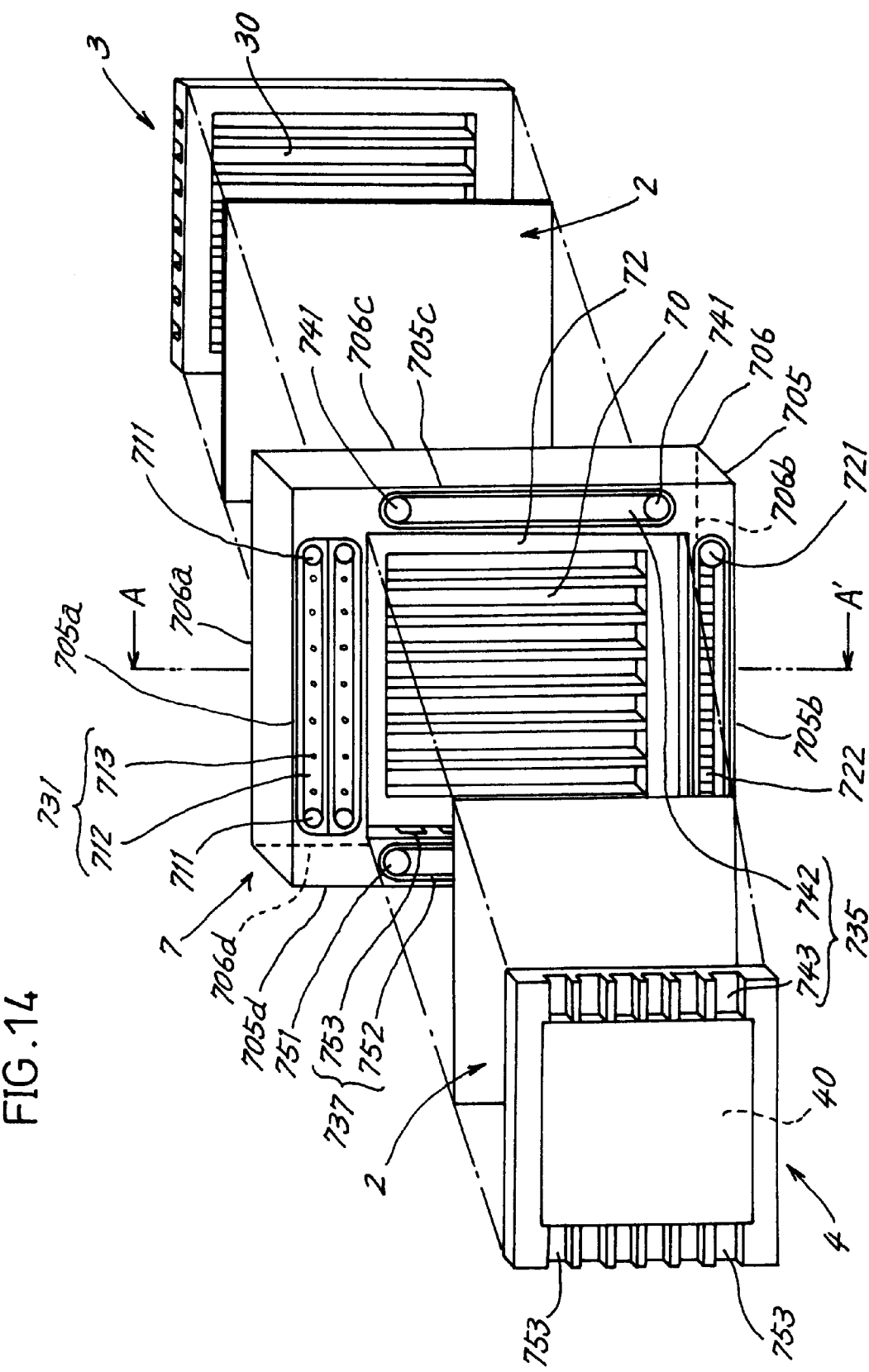
FIG. 14 is an exploded perspective view showing an embodiment wherein a stepped portion is formed on each of opposite surfaces of a bipolar plate.
Figure 15:
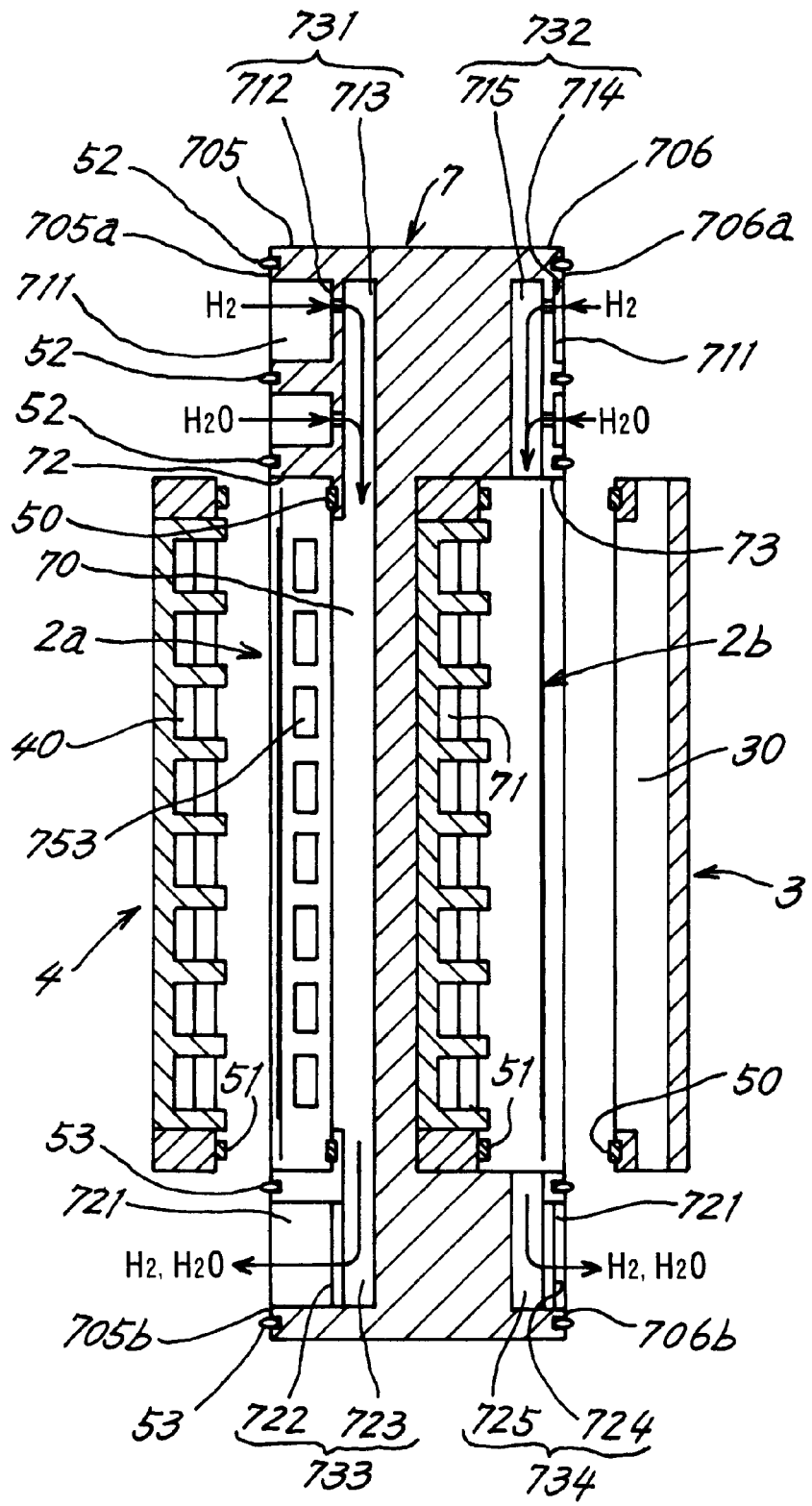
FIG. 15 is an exploded view in section taken along the line A–A' in FIG. 14.

FIGS. 6, 14 and 15 show embodiments comprising a bipolar plate 7 formed with a stepped portion on each surface of a base plate.

The bipolar plate 7 shown in FIG. 6 has a pair of first and second stepped portions 701, 702 approximately parallel to each other and projecting from one surface (the left surface in the drawing) of a generally rectangular base plate. The stepped portions 701, 702 and the base plate surface define a first recessed portion 72, and the base plate surface of the recessed portion 72 is recessed to provide an anode side chamber 70. The bipolar plate 7 has a pair of second and third stepped portions 703, 704 approximately parallel to each other and formed at the back of the respective first and second stepped portions 701, 702 on the other surface (the right surface in the drawing) of the base plate. The stepped portions 703, 704 and the base plate other surface define a second recessed portion 73, and the base plate surface of the recessed portion 73 is recessed to provide a cathode side chamber 71. The cell unit 1 of this embodiment comprises the bipolar plate 7, first and second cells 2a, 2b which are so sized as to fit into the respective recessed portions 72, 73 of the bipolar plate 7, an anode side plate 3 so sized as to fit into the second recessed portion 73 of the bipolar plate 7, and a cathode side plate 4 so sized as to fit into the first recessed portion 72 of the plate 7.

The bipolar plate 7 of the embodiment shown in FIG. 14 has first and second stepped portions 705, 706 formed on the respective surfaces of a base plate and extending along the entire outer periphery of the plate. More specifically, the bipolar plate 7 has a first stepped portion 705 projecting from one surface (the front side in the drawing) of a generally rectangular base plate and extending along an entire outer periphery of the base plate. The stepped portion 705 and the base plate surface define a first recessed portion 72, and the base plate surface of the recessed portion 72 is recessed to provide anode side chambers 70. The bipolar plate 7 has a second stepped portion 706 formed on the other surface (the rear side in the drawing) of the base plate along the entire outer periphery thereof. The stepped portion 706 and the base plate other surface define a second recessed portion 73, and the base plate surface of the recessed portion 73 is recessed to provide cathode side chambers 71.

Like the preceding embodiment, the embodiment comprising this bipolar plate 7 preferably has manifolds in the interior for equivalently supplying the fuel and oxidant and collectively discharging them.

These manifolds In the bipolar plate 7 will be described with reference to FIGS. 14 and 15. The first stepped portion 705 has first, second, third and fourth parts 705a, 705b, 705c, 705d, and the second stepped portion 706 has first, second, third and fourth parts 706a, 706b, 706c, 706d corresponding respectively to the first, second, third and fourth parts 705a, 705b, 705c, 705d of the first stepped portion 705.

The bipolar plate 7 has manifolds: fuel supply manifolds 711 for passing a fuel therethrough extending through the first part 705a of the first stepped portion 705, the base plate and the first part 706a of the second stepped portion 706; fuel discharge manifolds 721 for passing therethrough the fuel to be discharged extending through the second part 705b of the first stepped portion 705, the base plate and the second part 706b of the second stepped portion 706; oxidant supply manifolds 741 for passing an oxidant therethrough extending through the third part 705c of the first stepped portion 705, the base plate and the third part 706c of the second stepped portion 706; and oxidant discharge manifolds 751 for passing therethrough the oxidant to be discharged extending through the fourth part 705d of the first stepped portion 705, the base plate and the fourth part 706d of the second stepped portion 706.

The fuel supply manifolds 711 are held in communication with the anode side chambers 70 of the bipolar plate by a first manifold 731 and with the anode side chambers 30 of the anode side plate 3 by a second manifold 732.

The fuel discharge manifolds 721 are held in communication with the anode side chambers 70 of the bipolar plate by a third manifold 733 and with the anode side chambers 30 of the anode side plate 3 by a fourth manifold 734.

The oxidant supply manifolds 741 are held in communication with the cathode side chambers 40 of the cathode side plate 4 by a fifth manifold 735 and with the cathode side chambers 71 of the bipolar plate by a sixth manifold (not shown).

The oxidant discharge manifolds 751 are held in communication with the cathode side chambers 40 of the cathode side plate 4 by a seventh manifold 737 and with the cathode side chambers 71 of the bipolar plate by an eighth manifold (not shown).

The first manifold 731 comprises a fuel supply groove 712 communicating with the fuel supply manifolds 711, and fuel supply passageways 713 communicating with the groove 712 and the anode side chambers 70 of the bipolar plate.

The second manifold 732 comprises a fuel supply groove 714 communicating with the fuel supply manifolds 711, and fuel supply passageways 715 communicating with the groove 714 and the anode side chambers 30 of the anode side plate 3.

The third manifold 733 comprises a fuel discharge groove 722 communicating with the fuel discharge manifolds 721, and fuel discharge passageways 723 communicating with the groove 722 and the anode side chambers 70 of the bipolar plate.

The fourth manifold 734 comprises a fuel discharge groove 724 communicating with the fuel discharge manifolds 721, and fuel discharge passageways 725 communicating with the groove 724 and the anode side chambers 30 of the anode side plate 3.

The fifth manifold 735 comprises an oxidant supply groove 742 communicating with the oxidant supply manifolds 741, and oxidant supply passageways 743 communicating with the groove 742 and the cathode side chambers 40 of the cathode side plate 4.

The sixth manifold (not shown) comprises an oxidant supply groove (not shown) communicating with the oxidant supply manifolds 741, and oxidant supply passageways (not shown) communicating with the groove and the cathode side chambers 71 of the bipolar plate.

The seventh manifold 737 comprises an oxidant discharge groove 752 communicating with the oxidant discharge manifolds 751, and oxidant discharge passageways 753 communicating with the groove 752 and the cathode side chambers 40 of the cathode side plate 4.

The eighth manifold (not shown) comprises an oxidant discharge groove (not shown) communicating with the oxidant discharge manifolds 751, and oxidant supply passageways (not shown) communicating with the groove and the cathode side chambers 71 of the bipolar plate.

The cell unit 1 comprising a bipolar plate having a recessed portion in each of its opposite surfaces serves to further diminish the number of seal members required.

The embodiments described above are intended to illustrate the present invention and should not be construed as restricting the invention defined in the appended claims or reducing the scope thereof. The cell unit of the invention is not limited to the foregoing embodiments in construction but can of course be modified variously within the technical scope as set forth in the claims.

What is claimed is:

1. A cell unit for use in fuel cells which is characterized in that the cell unit comprises:

an anode side plate having a pair of first and second stepped portions substantially parallel to each other and projecting from one surface of a generally rectangular base plate, the stepped portions and the base plate surface defining a recessed portion, the base plate surface of the recessed portion being recessed to provide an anode side chamber, a cell including an electrode portion having an anode formed on one surface of an electrolyte in the form of a plate or film and a cathode formed on the other surface of the electrolyte, the cell being accommodated in the recessed portion of the anode side plate with the anode facing the anode side chamber of the anode side plate, and a cathode side plate having a cathode side chamber formed in one surface of a generally rectangular base plate, the cathode side plate being accommodated in the recessed portion of the anode side plate with the cathode side chamber facing the cathode of the cell, the stepped portions of the anode side plate having respective top faces substantially flush with the other surface of the cathode side plate, with the cell and the cathode side plate accommodated in the recessed portion of the anode side plate.

2. A cell unit for use in fuel cells according to claim 1 wherein the anode side plate has a fuel supply manifold extending through the first stepped portion and the base plate thereof for passing a fuel therethrough, the fuel supply manifold being held in communication with the anode side chamber by a first manifold, and the anode side plate has a fuel discharge manifold extending through the second stepped portion and the base plate thereof for passing therethrough the fuel to be discharged, the fuel discharge manifold being held in communication with the anode side chamber by a second manifold.

3. A cell unit for use in fuel cells according to claim 2 wherein the first manifold comprises a fuel supply groove communicating with the fuel supply manifold, and a plurality of fuel supply passageways communicating with the fuel supply groove and the anode side chamber, and the second manifold comprises a fuel discharge groove communicating with the fuel discharge manifold, and a plurality of fuel discharge passageways communicating with the fuel discharge groove and the anode side chamber.

4. A cell unit for use in fuel cells according to claim 1 wherein the cathode side plate has opposite side edges orthogonal to the stepped portions of the anode side plate and extending beyond the anode side plate, the side edge extensions being formed with a first and second stepped portions.

5. A cell unit for use in fuel cells according to claim 4 wherein the cathode side plate has an oxidant supply manifold extending through the first stepped portion and the base plate thereof for passing an oxidant therethrough, the oxidant supply manifold being held in communication with the cathode side chamber by a first manifold, and the cathode side plate has an oxidant discharge manifold extending through the second stepped portion and the base plate thereof for passing therethrough the oxidant to be discharged, the oxidant discharge manifold being held in communication with the cathode side chamber by a second manifold.

6. A cell unit for use in fuel cells according to claim 5 wherein the first manifold comprises an oxidant supply groove communicating with the oxidant supply manifold, and a plurality of oxidant supply passageways communicating with the oxidant supply groove and the cathode side chamber, and the second manifold comprises a oxidant discharge groove communicating with the oxidant discharge manifold, and a plurality of oxidant discharge passageways communicating with the oxidant discharge groove and the cathode side chamber.

7. A cell unit for use in fuel cells according to claim 1 wherein the anode side plate and/or the cathode side plate are/is provided with means for restraining one of both of the plates from moving in a direction parallel to the surface.

8. A cell unit for use in fuel cells according to claim 1 wherein the fuel cell is a solid polymer electrolyte fuel cell.

9. A cell unit for use in fuel cells which is characterized in that the cell unit comprises:
a cathode side plate having a pair of first and second stepped portions substantially parallel to each other and projecting from one surface of a generally rectangular base plate, the stepped portions and the base plate surface defining a recessed portion, the base plate surface of the recessed portion being recessed to provide a cathode side chamber,
a cell including an electrode portion having an anode formed on one surface of an electrolyte in the form of a plate or film and a cathode formed on the other surface of the electrolyte, the cell being accommodated in the recessed portion of the cathode side plate with the cathode facing the cathode side chamber of the cathode side plate, and
an anode side plate having an anode side chamber formed in one surface of a generally rectangular base plate, the anode side plate being accommodated in the recessed portion of the cathode side plate with the anode side chamber facing the anode of the cell,
the stepped portions of the cathode side plate having respective top faces substantially flush with the other surface of the anode side plate, with the cell and the anode side plate accommodated in the recessed portion of the cathode side plate.

10. A cell unit for use in fuel cells according to claim 9 wherein the cathode side plate has an oxidant supply manifold extending through the first stepped portion and the base plate thereof for passing an oxidant therethrough, the oxidant supply manifold being held in communication with the cathode side chamber by a first manifold, and the cathode side plate has an oxidant discharge manifold extending through the second stepped portion and the base plate thereof for passing therethrough the oxidant to be discharged, the oxidant discharge manifold being held in communication with the cathode side chamber by a second manifolds.

11. A cell unit for use in fuel cells according to claim 10 wherein the first manifold comprises an oxidant supply groove communicating with the oxidant supply manifold, and a plurality of oxidant supply passageways communicating with the oxidant supply groove and the cathode side chamber, and the second manifold comprises an oxidant discharge groove communicating with the oxidant discharge manifold, and a plurality of oxidant discharge passageways communicating with the oxidant discharge groove and the cathode side chamber.

12. A cell unit for use in fuel cells according to claim 9 wherein the anode side plate and/or the cathode side plate are/is provided with means for restraining one of both of the plates from moving in a direction parallel to the surface.

13. A cell unit for use in fuel cells which is characterized in that the cell unit comprises:
an anode side plate having a stepped portion projecting from one surface of a generally rectangular base plate and extending along an entire outer periphery of the base plate, the stepped portions and the base plate surface defining a recessed portion, the base plate surface of the recessed portion being recessed to provide an anode side chamber,
a cell including an electrode portion having an anode formed on one surface of an electrolyte in the form of a plate or film and a cathode formed on the other surface of the electrolyte, the cell being accommodated in the recessed portion of the anode side plate with the anode facing the anode side chamber of the anode side plate, and
a cathode side plate having a cathode side chamber formed in one surface of a generally rectangular base plate, the cathode side plate being accommodated in the recessed portion of the anode side plate with the cathode side chamber facing the cathode of the cell,
the stepped portion of the anode side plate having a top face substantially flush with the other surface of the cathode side plate, with the cell and the cathode side plate accommodated in the recessed portion of the anode side plate.

14. A cell unit for use in fuel cells according to claim 13 wherein the stepped portion of the anode side plate has first, second, third and fourth parts, a fuel supply manifold for passing a fuel therethrough extending through the first part of the stepped portion and the base plate thereof and being held in, communication with the anode side chamber by a first manifold, a fuel discharge manifold for passing therethrough the fuel to be discharged extending through the second part of the stepped portion and the base plate thereof and being held in communication with the anode side chamber by a second manifold, an oxidant supply manifold for passing an oxidant therethrough extending through the third part of the stepped portion and the base plate thereof and being held in communication with the cathode side chamber by a third manifold, an oxidant discharge manifold for passing therethrough the oxidant to be discharged extending through the fourth part of the stepped portion and the base plate thereof and being held in communication with the cathode side chamber by a fourth manifold.

15. A cell unit for use in fuel cells which is characterized in that the cell unit comprises:

a cathode side plate having a stepped portion projecting from one surface of a generally rectangular base plate and extending along an entire outer periphery of the base plate, the stepped portion and the base plate surface defining a recessed portion, the base plate surface of the recessed portion being recessed to provide a cathode side chamber, a cell including an electrode portion having an anode formed on one surface of an electrolyte in the form of a plate or film and a cathode formed on the other surface of the electrolyte, the cell being accommodated in the recessed portion of the cathode side plate with the cathode facing the cathode side chamber of the cathode side plate, and an anode side plate having an anode side chamber formed in one surface of a generally rectangular base plate, the anode side plate being accommodated in the recessed portion of the cathode side plate with the anode side chamber facing the anode of the cell, the stepped portion of the cathode side plate having a top face substantially flush with the other surface of the anode side plate, with the cell and the anode side plate accommodated in the recessed portion of the cathode side plate.

16. A cell unit for use in fuel cells according to claim 15 wherein the stepped portion of the cathode side plate has first, second, third and fourth parts, a fuel supply manifold for passing a fuel therethrough extending through the first part of the stepped portion and the base plate thereof and being held in communication with the anode side chamber by a first manifold, a fuel discharge manifold for passing therethrough the fuel to be discharged extending through the second part of the stepped portion and the base plate thereof and being held in communication with the anode side chamber by a second manifold, an oxidant supply manifold for passing an oxidant therethrough extending through the third part of the stepped portion and the base plate thereof and being held in communication with the cathode side chamber by a third manifold, an oxidant discharge manifold for passing therethrough the oxidant to be discharged extending through the fourth part of the stepped portion and the base plate thereof and being held in communication with the cathode side chamber by a fourth manifold.

* * * * *